(12) United States Patent
Yazaki et al.

(10) Patent No.: US 9,419,487 B2
(45) Date of Patent: Aug. 16, 2016

(54) ROTARY ELECTRIC MACHINE

(71) Applicant: HONDA MOTOR CO., LTD., Tokyo (JP)

(72) Inventors: Manabu Yazaki, Utsunomiya (JP); Koichi Ono, Utsunomiya (JP); Satoshi Yamada, Utsunomiya (JP); Tarou Genda, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/356,178

(22) PCT Filed: Nov. 8, 2012

(86) PCT No.: PCT/JP2012/078934
§ 371 (c)(1),
(2) Date: May 5, 2014

(87) PCT Pub. No.: WO2013/077190
PCT Pub. Date: May 30, 2013

(65) Prior Publication Data
US 2014/0354094 A1    Dec. 4, 2014

(30) Foreign Application Priority Data

Nov. 22, 2011 (JP) ................................ 2011-255217

(51) Int. Cl.
*H02K 3/28* (2006.01)
*H02K 3/52* (2006.01)

(52) U.S. Cl.
CPC ............... *H02K 3/28* (2013.01); *H02K 3/522* (2013.01); *H02K 2203/06* (2013.01); *H02K 2203/12* (2013.01)

(58) Field of Classification Search
USPC ........................................................ 310/71
See application file for complete search history.

(56) References Cited

U.S. PATENT DOCUMENTS 6,288,462 B1 *   9/2001   Tanaka ..................... H02K 3/50
                                                                310/208
7,928,619 B2 *   4/2011   Watanabe et al. ............... 310/71
(Continued)

FOREIGN PATENT DOCUMENTS

CN       101442230 A      5/2009
JP       2001-25187 A     1/2001
(Continued)

OTHER PUBLICATIONS

International Search Report dated Feb. 12, 2013, issued in corresponding application No. PCT/JP2012/078934.
(Continued)

*Primary Examiner* — Naishadh Desai
(74) *Attorney, Agent, or Firm* — Westerman, Hattori, Daniels & Adrian, LLP

(57) ABSTRACT

A rotary electric machine includes: a stator core that is formed of a plurality of split core pieces that are annularly arranged therein, coil conductors being wound around respective split core pieces. One ends of the respective coil conductors which are wound around the respective split core pieces are connected to power supply terminals for corresponding phases, and other ends of the respective coil conductors are connected to each other to form a neutral point, the respective coil conductors are formed of rectangular wires, and the neutral point-side end portions of the respective coil conductors are led to an outside of the stator core from one point on a circumference of the stator core.

8 Claims, 19 Drawing Sheets

(56) References Cited

U.S. PATENT DOCUMENTS

| | | | |
|---|---|---|---|
| 2002/0043883 A1* | 4/2002 | Shimizu | 310/71 |
| 2002/0180299 A1* | 12/2002 | Oohashi | H02K 3/28 310/184 |
| 2003/0129856 A1* | 7/2003 | Takizawa | H02K 3/50 439/13 |
| 2004/0012292 A1* | 1/2004 | Kometani et al. | 310/184 |
| 2008/0224560 A1* | 9/2008 | Yoshida et al. | 310/184 |
| 2010/0207466 A1* | 8/2010 | Endo et al. | 310/71 |
| 2011/0187484 A1* | 8/2011 | Owen | 336/5 |

FOREIGN PATENT DOCUMENTS

| | | |
|---|---|---|
| JP | 2007-259553 A | 10/2007 |
| JP | 2009-106003 A | 5/2009 |
| JP | 2011-60524 A | 3/2011 |

OTHER PUBLICATIONS

Office Action dated Oct. 19, 2015, issued in counterpart Chinese Patent Application No. 201280056839.6, with English translation (11 pages).

* cited by examiner

ROTARY ELECTRIC MACHINE

TECHNICAL FIELD

The present invention relates to a rotary electric machine that is used for driving a vehicle, regenerative power generation, or the like, and more particularly, to a rotary electric machine in which a plurality of coil conductors are wound around an annular stator core.

Priority is claimed on Japanese Patent Application No. 2011-255217, filed Nov. 22, 2011, the content of which is incorporated herein by reference.

BACKGROUND ART

A structure in which a stator core is formed of a plurality of split core pieces to facilitate a smooth operation for winding coil conductors and to increase a space factor is known in a rotary electric machine that is used for driving a vehicle, regenerative power generation, or the like (for example, see Patent Document 1).

Patent Document 1 discloses a rotary electric machine in which coil conductors are individually wound around the respective split core pieces, the split core pieces around which the coil conductors have been wound are annularly assembled, one ends of the respective coil conductors of the split core pieces are connected to power supply lines for corresponding phases, and the other ends of the respective coil conductors are connected to a midpoint bus ring connecting the other ends of all the coil conductors as a neutral point.

PRIOR ART DOCUMENTS

Patent Documents

[Patent Document 1] Japanese Unexamined Patent Application, First Publication No. 2001-25187

DISCLOSURE OF INVENTION

Problems to be Solved by Invention

However, the midpoint bus ring, which is an annular metal member, is provided in the rotary electric machine in the conventional art to allow the other ends of all the coil conductors to be connected to each other. For this reason, a large component needs to be provided close to the stator core, which is likely to cause the size and weight of the machine to increase.

Since the midpoint bus ring should have the shape of a complicated connection portion to which the respective coil conductors are connected in the rotary electric machine in the conventional art, there is also a concern that manufacturing cost increases.

The invention has been made in consideration of the above-mentioned problem, and an object of the invention is to provide a rotary electric machine in which coil conductors can be connected by a simple structure without adding large exclusive components and of which the size, the weight, and manufacturing cost can be reduced.

Means for Solving the Problems

The invention has employed the following structure to solve the above-mentioned problem.

(1) That is, a rotary electric machine according to an aspect of the invention includes a stator core that is formed of a plurality of split core pieces that are annularly arranged therein, coil conductors being wound around respective split core pieces. One ends of the respective coil conductors, which are wound around the respective split core pieces, are connected to power supply terminals for corresponding phases, and other ends of the respective coil conductors are connected to each other to form a neutral point, the respective coil conductors are formed of rectangular wires, neutral point-side end portions of the respective coil conductors are led to an outside of the stator core from one point on a circumference of the stator core, and the neutral point-side end portions form a midpoint connecting portion in which flat surfaces of the rectangular wires come into surface contact with each other, the adjacent rectangular wires are physically joined to each other, and all the rectangular wires are electrically connected to each other.

(2) In the rotary electric machine according to (1), in the midpoint connecting portion, the neutral point-side end portions of the respective coil conductors may be aligned in a line in a state that the rectangular wires may overlap each other in the shape of layers, the neutral point-side end portions, which may be aligned in a line, may be held by a binding member made of metal, and the binding member may be connected to the neutral point-side end portions of the respective coil conductors by fusing.

(3) In the rotary electric machine according to (1) or (2), the power supply terminals for the respective phases, which are connected to one ends of the respective coil conductors, may be collectively disposed at one point outside the stator core, and the midpoint connecting portion may be disposed at a position that is adjacent to any one of the power supply terminals for the respective phases.

(4) In the rotary electric machine according to (3), the stator core may be installed in a housing together with a terminal block made of an insulating material, the housing containing the stator core, the power supply terminals for the respective phases may be connected to corresponding external power supply lines in the terminal block, and the midpoint connecting portion may be disposed so as to protrude into the terminal block.

(5) In the rotary electric machine according to (4), the terminal block may be fixed to the housing at an outer peripheral portion of the stator core by a fastening member, and the midpoint connecting portion may protrude into the terminal block at a position that is present outside the stator core in a radial direction, overlaps an installation portion of the fastening member in a circumferential direction of the stator core, and is separated from the installation portion in an axial direction of the stator core.

(6) In the rotary electric machine according to (5), connection ends of the respective coil conductors, which are connected to the power supply terminals for the respective phases, may protrude from an outer peripheral side of the stator core toward the outside in the radial direction, and the midpoint connecting portion and one or more connection ends of the connection ends may protrude to the outside of one split core piece of an outer peripheral surface of the stator core in the radial direction.

Effects of the Invention

According to (1), the neutral point-side end portions of the respective coil conductors, which are formed of rectangular wires, are led to the outside of the stator core from one point on the circumference of the stator core, and form a midpoint connecting portion in which the flat surfaces of the rectangular wires come into surface contact with each other, the adjacent rectangular wires are physically joined to each other, and all the rectangular wires (the respective coil conductors) are electrically connected to each other. For this reason, it is possible to connect the neutral point-side end portions of the respective coil conductors in a stable connection state without adding large exclusive components, and to suppress an occupied space to a small size. Accordingly, it is possible to reduce the size, the weight, and the manufacturing cost of the machine.

According to (2), the neutral point-side end portions of the plurality of coil conductors, that is, the rectangular wires overlap each other in the shape of layers and are aligned in a line, and the aligned end portions are held by a binding member made of metal. Further, the binding member is connected to the neutral point-side end portions of the respective coil conductors in this state by fusing, so that the midpoint connecting portion is formed. For this reason, it is possible to easily and reliably connect the neutral point-side end portions of the plurality of coil conductors.

According to (3), the power supply terminals for the respective phases are collectively disposed at one point outside the stator core, and the midpoint connecting portion is disposed at a position that is adjacent to any one of the power supply terminals for the respective phases. For this reason, it is possible to collect the plurality of current flow portions, which protrude to the outside of the stator core, and to stably manage these current flow portions in a small space.

According to (4), the insulating terminal block, which connects the power supply terminals for the respective phases to corresponding external power supply lines, is installed in the housing together with the stator core, and the midpoint connecting portion is disposed so as to protrude into the terminal block. For this reason, it is possible to ensure insulation between the midpoint connecting portion and the housing or the power supply terminals for the respective phases by the terminal block.

According to (5), the midpoint connecting portion protrudes into the terminal block at the position that is present outside the stator core in the radial direction, overlaps the installation portion of the fastening member in the circumferential direction of the stator core, and is separated from the installation portion in the axial direction of the stator core. For this reason, the midpoint connecting portion is disposed coaxially with the installation portion of the fastening member present on the terminal block while being insulated. Accordingly, it is possible to reduce the size of the terminal block, and eventually, to further reduce the size of the entire machine.

According to (6), the midpoint connecting portion and a power supply-side connection end of the coil conductor for at least one phase protrude to the outside, which corresponds to the stator core, of one split core piece of the outer peripheral surface of the stator core in the radial direction. For this reason, it is possible to further reduce the size of the terminal block by more collectively disposing the midpoint connecting portion and the connection ends for the plurality of phases.

EMBODIMENTS FOR CARRYING OUT THE INVENTION

A rotary electric machine according to an embodiment of the invention will be described with reference to the drawings.

Figure 1:
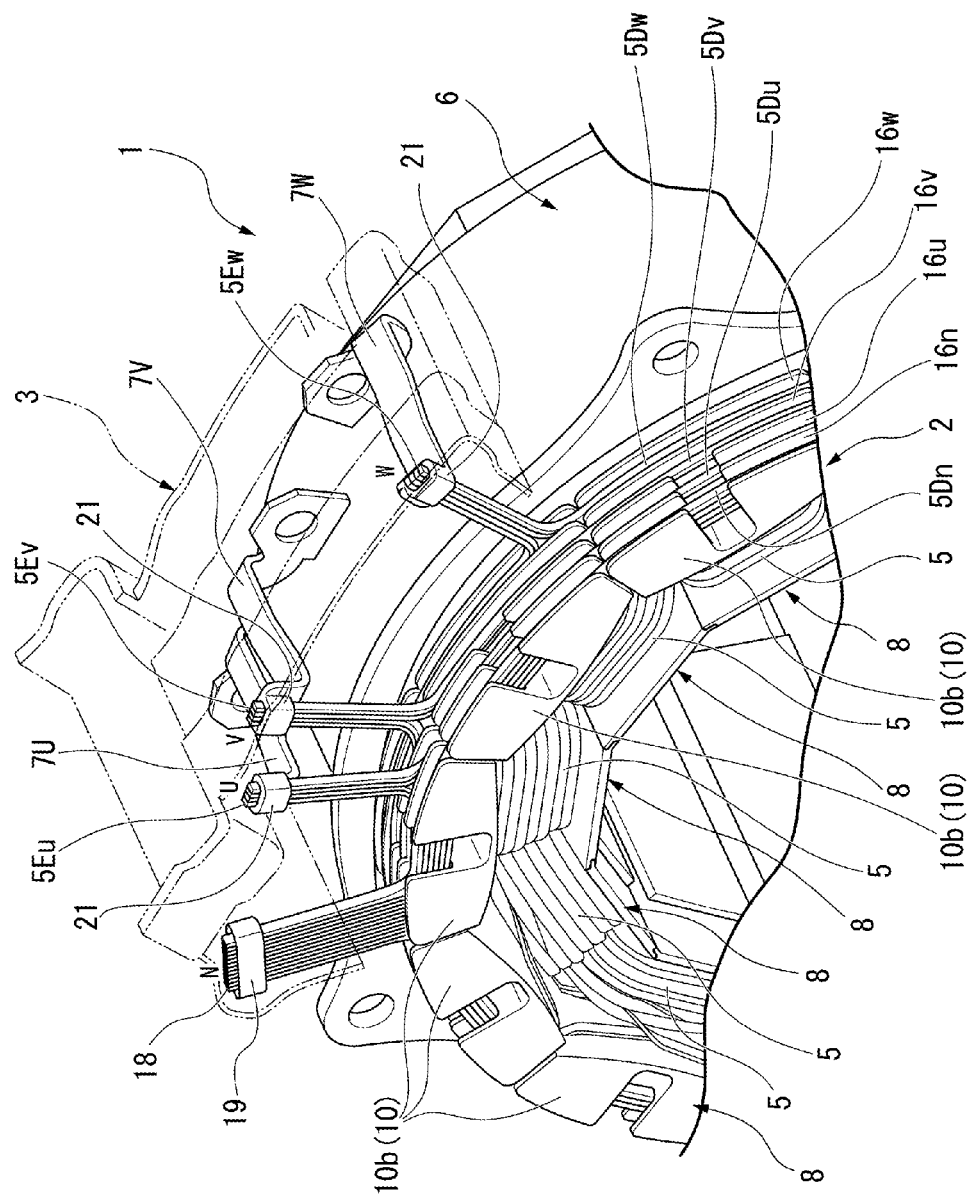
FIG. 1 is a perspective view showing a part of a stator that is assembled in a rotary electric machine according to an embodiment of the invention.
Figure 2:
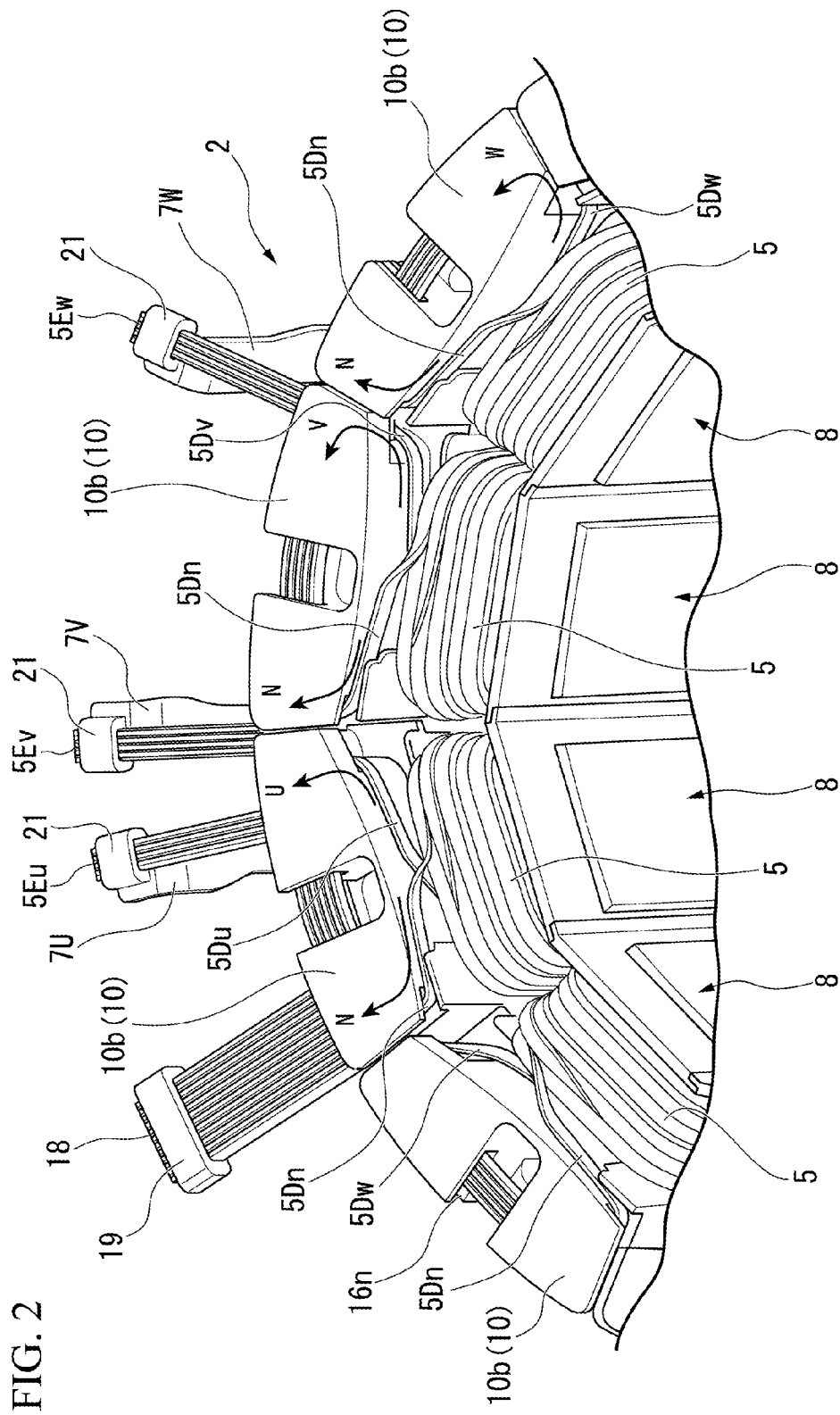
FIG. 2 is a perspective view showing a part of a stator core of the stator of the rotary electric machine according to the embodiment of the invention.
Figure 3:
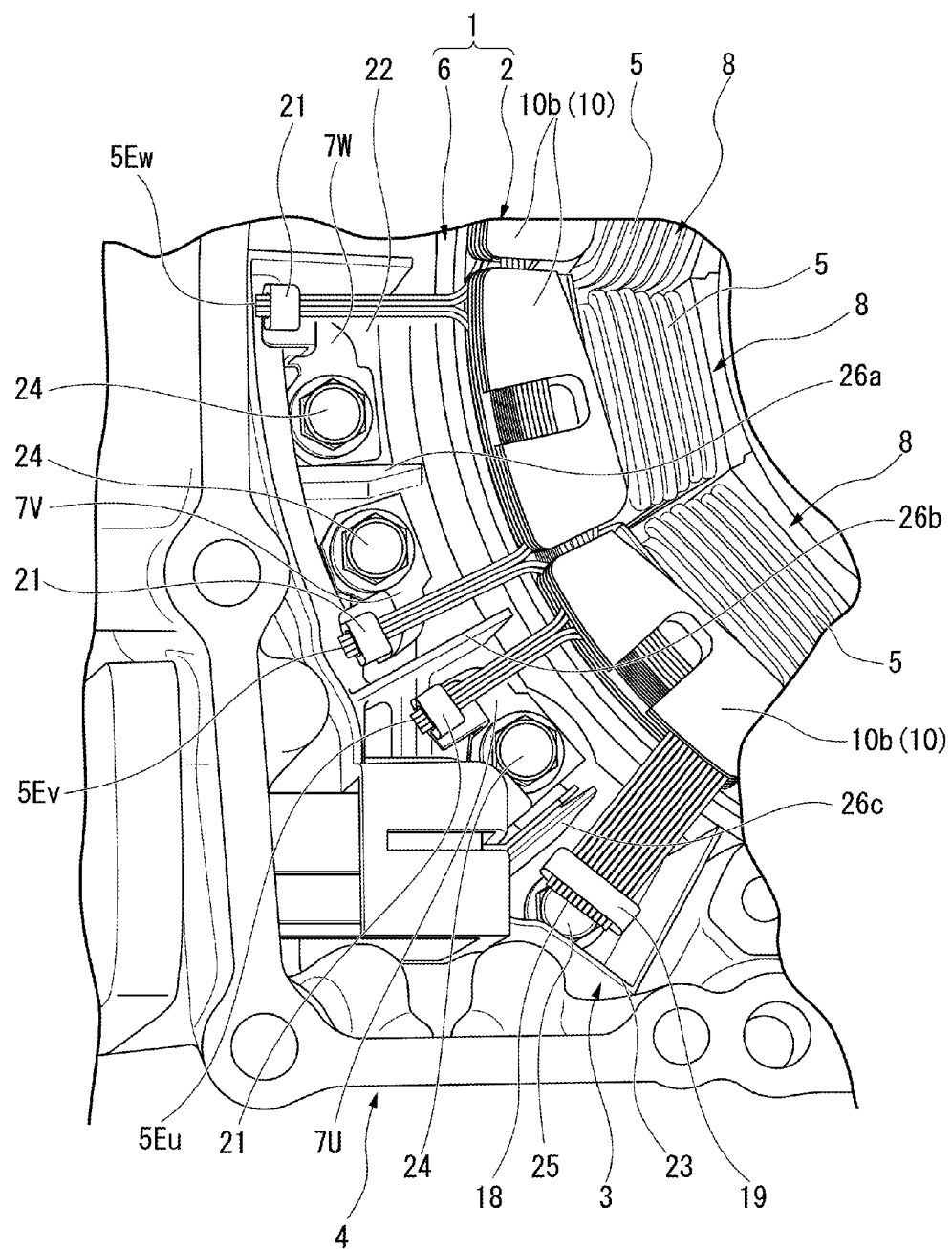
FIG. 3 is a front view of a part of the rotary electric machine showing a state in which the stator of the rotary electric machine according to the embodiment of the invention is assembled in a housing.

FIG. 1 is a view showing a stator 1 that is assembled in a rotary electric machine according to this embodiment. FIG. 2 is a view showing a stator core 2 of the stator 1. FIG. 3 is a view showing a state in which the stator 1 is assembled in a housing 4 together with a terminal block 3.

The rotary electric machine according to this embodiment is a three-phase AC rotary electric machine that is used for the driving and regenerative power generation of an electric automobile or a hybrid vehicle, and a rotor (not shown) is rotatably disposed in an annular stator 1. The rotor is connected to an axle of a vehicle through a speed reduction mechanism or the like.

The stator 1 includes an annular stator core 2 in which a plurality of coil conductors 5 are mounted with salient pole concentrated winding, and a substantially cylindrical holder 6 into which the stator core 2 is press-fitted. Further, power supply terminals 7U, 7V, and 7W for the corresponding phases are connected to power supply-side end portions of coil conductors 5 for a U phase, a V phase, and a W phase that are led from the stator core 2 to the outside of the holder 6 in a radial direction, respectively.

In this embodiment, rectangular wires having a horizontally long rectangular cross-section are employed as all the coil conductors 5.

A plurality of split core pieces 8, which substantially has the shape of a fan in a front view, are annularly assembled, so that the stator core 2 is formed. The coil conductors 5 are individually wound around the respective split core pieces 8. One ends of the respective coil conductors 5, which are wound around the split core pieces 8, are collected for each phase and are connected to the power supply terminals 7U, 7V, and 7W for the corresponding phases and all of the other ends of the respective coil conductors 5 are collected at one point and are electrically connected to each other. In the stator core 2, the coil conductors 5 for the respective phases are connected by Y-connection.

In this embodiment, the number of the split core pieces 8 is twelve in total, the number of the split core pieces 8 for each of a U phase, a V phase, and a W phase is four, and the split core pieces 8 are sequentially disposed side by side in a circumferential direction so that a U phase, a V phase, and a W phase are repeated.

Figure 4:
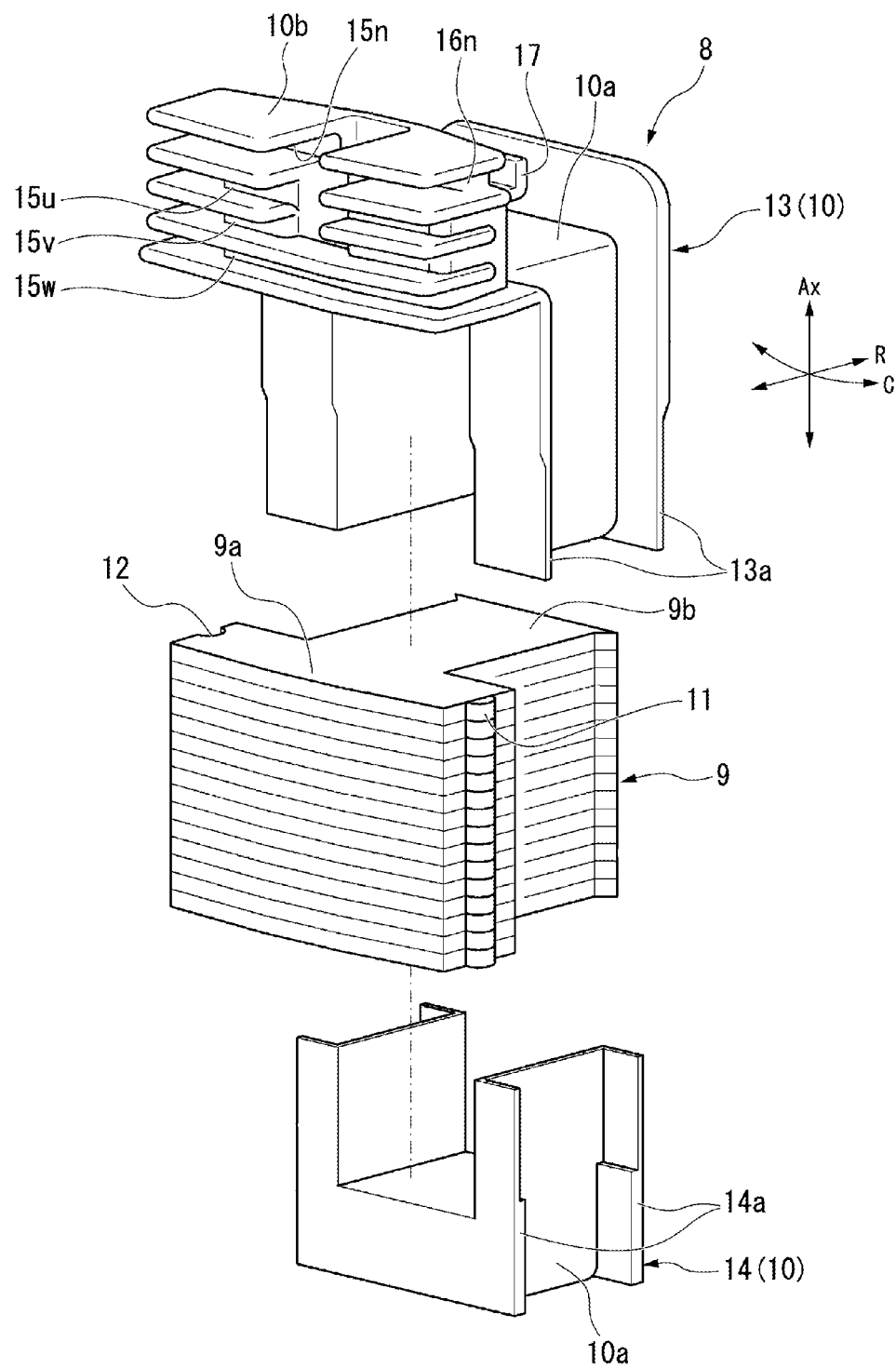
FIG. 4 is an exploded perspective view of a split core piece of the stator core of the rotary electric machine according to the embodiment of the invention.

FIG. 4 is an exploded perspective view showing components of the split core piece 8.

The split core piece 8 includes a core body 9 that is formed of a plurality of laminated steel plates, and an insulator 10 that is fitted to a peripheral portion of the core body 9 and electrically insulates the core body 9.

The core body 9 includes a yoke portion 9a that forms an arc-shaped region of an outer peripheral portion of the stator core 2, and a tooth portion 9b that protrudes from an inner peripheral side of the yoke portion 9a toward the inside of the stator core 2 in a radial direction. A projection portion 11 is formed on one end face of the yoke portion 9a in an arc direction, and a recessed portion 12 is formed on the other end face thereof. The projection portion 11 and the recessed portion 12 are formed in a semicircular shape so as to have the same size, so that the projection portion 11 and the recessed portion 12 are fitted to each other between the yoke portions 9a of the adjacent split core pieces 8. Further, an insulator 10 is fitted to an outer peripheral surface of the tooth portion 9b in a protruding direction, and the coil conductors 5 are wound around the outer peripheral portion of the tooth portion 9b with the insulator 10 interposed therebetween.

Figure 5:
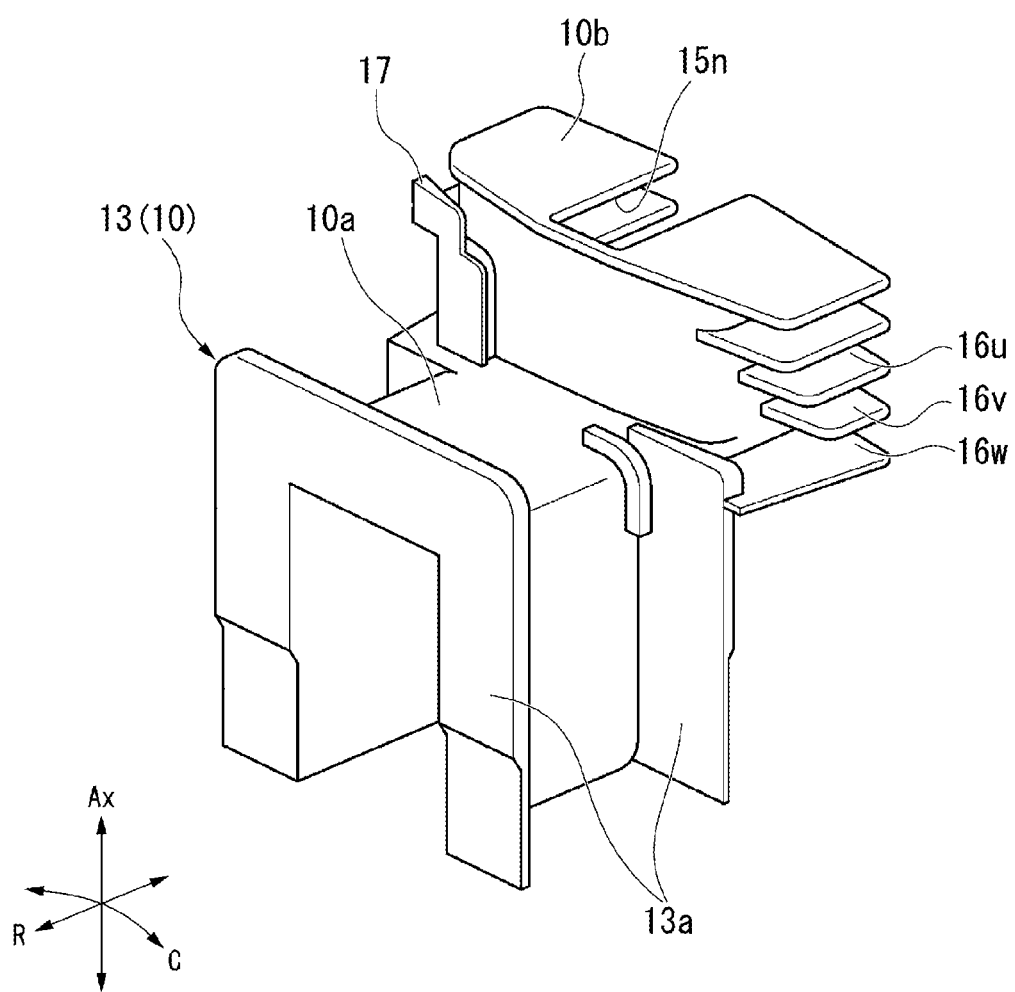
FIG. 5 is a perspective view showing a part of an insulator of the split core piece of the rotary electric machine according to the embodiment of the invention.
Figure 6:
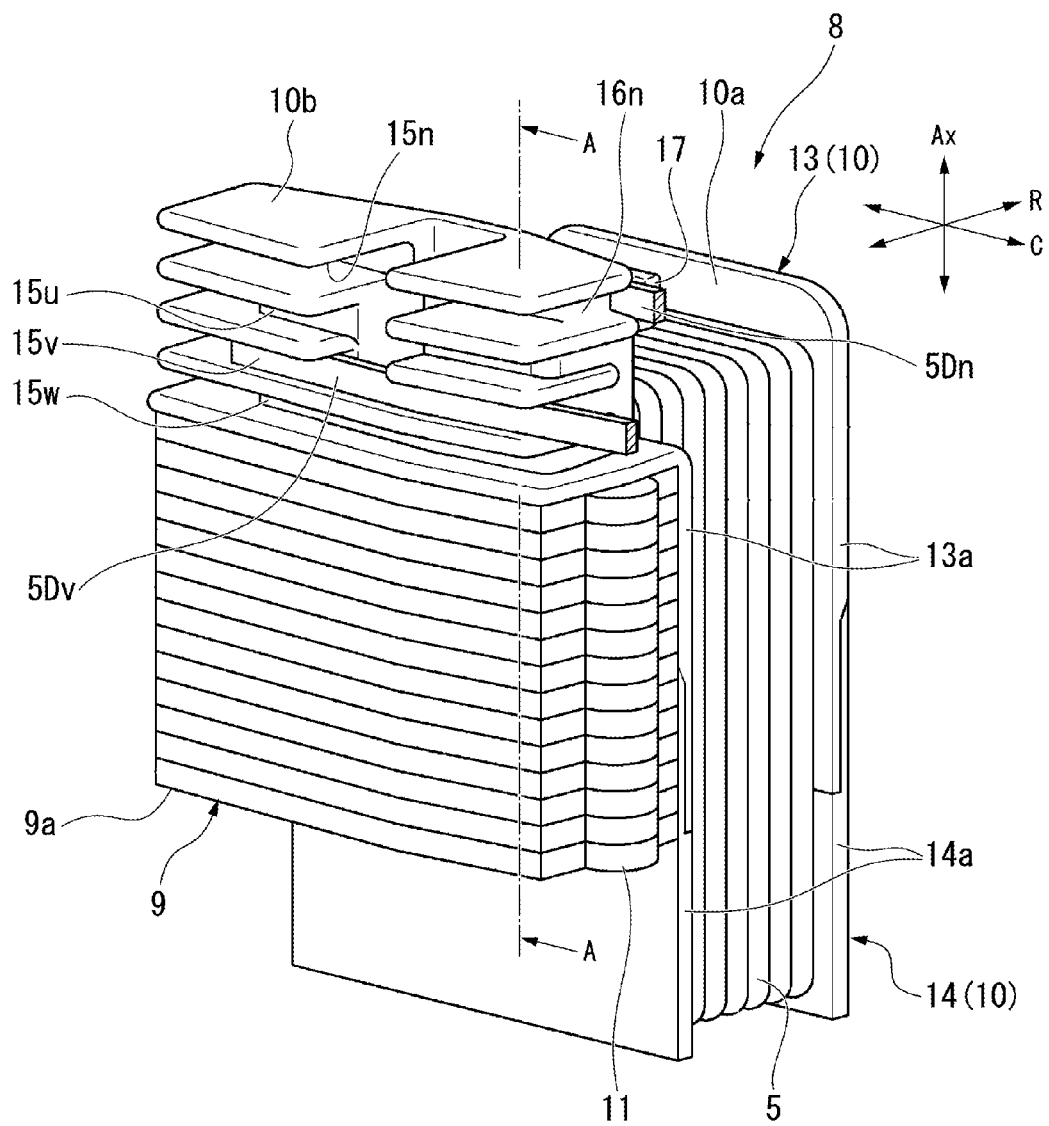
FIG. 6 is a perspective view of the split core piece, around which coil conductors are wound, of the rotary electric machine according to the embodiment of the invention.
Figure 7:
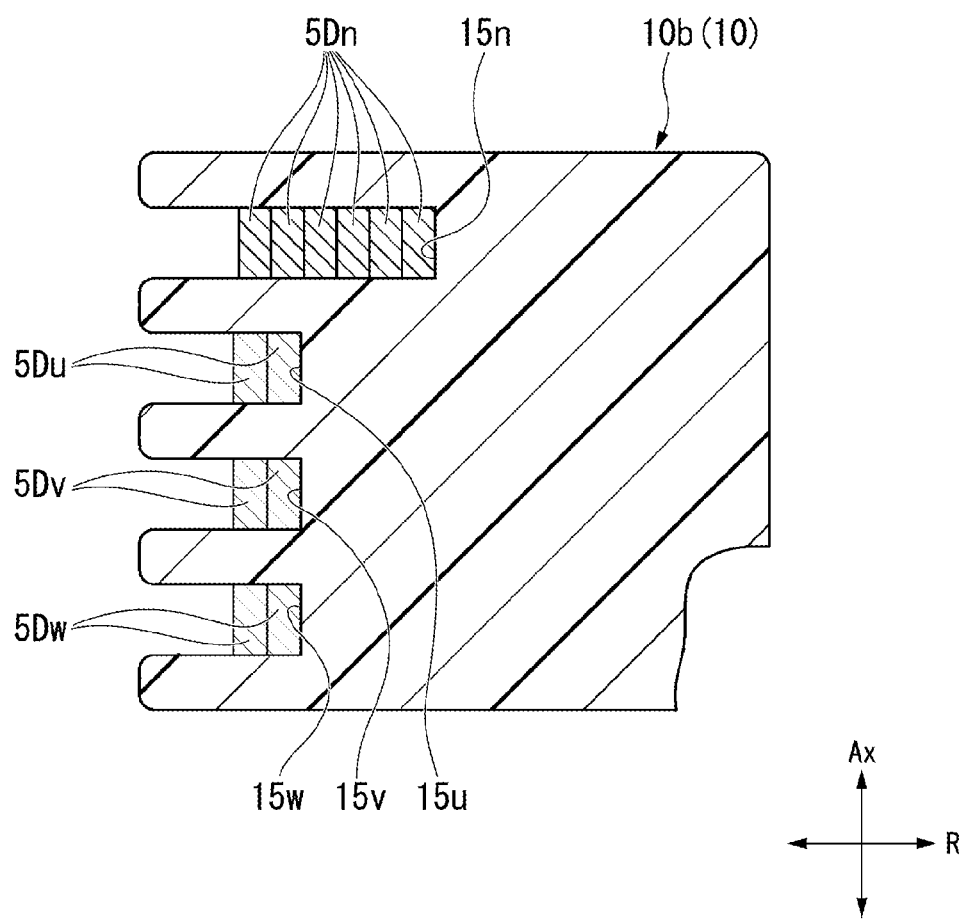
FIG. 7 is a cross-sectional view of the insulator of the rotary electric machine according to the embodiment of the invention that corresponds to a cross-section taken along line A-A of FIG. 6.

FIG. 5 is a perspective view showing a part of the insulator 10. FIG. 6 is a perspective view showing the split core piece 8 around which the coil conductors 5 are wound. FIG. 7 is a cross-sectional view corresponding to a cross-section taken along line A-A of FIG. 6. In these drawings that include FIG. 4 and illustrate the split core piece 8, arrows C, R, and Ax indicate a circumferential direction, a radial direction, and an axial direction of the stator core 2, respectively. The circumferential direction, the radial direction, and the axial direction of the stator core 2 are the same as a circumferential direction, a radial direction, and an axial direction of the stator 1.

The insulator 10 is fitted to the tooth portion 9b of the core body 9. The insulator 10 includes: a coil winding portion 10a has the outer peripheral portion around which the coil conductors 5 are wound; and a conductor guide portion 10b that leads leading portions 5Du, 5Dv, and 5Dw, and 5Dn formed at start ends and terminal ends of the respective coil conductors 5 wound around the coil winding portion 10a to predetermined positions on the circumference along the circumferential direction of the stator core 2.

A portion of the coil winding portion 10a of the insulator 10, which is fitted to the tooth portion 9b of the core body 9, is formed of two parts that are split into halves at the peripheral portion of the tooth portion 9b.

Here, when one of the two parts is called a first half-split body 13 and the other thereof is called a second half-split body 14, the conductor guide portion 10b is formed integrally with the first half-split body 13 that is one part. Flange portions 13a and 14a are formed at both side portions of the first and second half-split bodies 13 and 14 in an extending direction (R direction) of the tooth portion 9b, respectively, and the coil conductors 5 are wound between the flange portions 13a and 14a formed at both the side portions of the first and second half-split bodies.

On the other hand, the conductor guide portion 10b of the insulator 10 is formed as an integrated block at a position that is present on one side of the coil winding portion 10a in the R direction and overlaps the arc-shaped side surface of the yoke portion 9a of the core body 9. The block of the conductor guide portion 10b is formed so as to have a substantially arc shape in a plan view that is seen in the Ax direction (axial direction) shown in the drawings, and four guide grooves 15n, 15u, 15v, and 15w along the circumferential direction (C direction) of the stator core 2 are formed on the surface corresponding to the outer peripheral surface of the stator core 2 so as to form four stages in the axial direction (Ax direction). When all the split core pieces 8 are annularly assembled, these guide grooves 15n, 15u, 15v, and 15w form four independent annular grooves and the leading portions 5Dn, 5Du, 5Dv, and 5Dw of the respective coil conductors 5 are led into the annular grooves.

The widths of the guide grooves 15n, 15u, 15v, and 15w of the insulator 10 are set to substantially correspond to the length of the length of the long side (to be slightly larger than the length of the long side) of the cross-section of the coil conductor 5. As shown in FIG. 7, the number of power supply-side leading portions 5Du, 5Dv, and 5Dw of the coil conductors 5 fitted into the guide grooves 15u, 15v, and 15w, respectively, is up to two, but the number of neutral point-side leading portions 5Dn of the coil conductors 5 fitted into the guide groove 15n is up to six. For this reason, the guide groove 15n is deeper than the other guide grooves 15u, 15v, and 15w.

Further, a leading groove 16n, which leads the neutral point-side end portions (the leading portions 5Dn) of the coil conductors 5 into the corresponding guide groove 15n from the coil winding portion 10a, is formed on one end face of the block of the conductor guide portion 10b in the arc direction as shown in FIGS. 4 and 6, and leading grooves 16u, 16v, and 16w, which lead the power supply-side end portions (the leading portions 5Du, 5Dv, and 5Dw) of the coil conductors 5 into the corresponding guide grooves 15u, 15v, and 15w from the coil winding portion 10a, are formed on the other end face of the block in the arc direction as shown in FIG. 5.

Reference numeral 17 of FIGS. 4 to 6 denotes a guide wall that is formed on the surface of the block facing the coil winding portion 10a to guide the neutral point-side end portions (the leading portions 5Dn) of the coil conductors 5, which are led from the coil winding portion 10a, into the leading groove 16n.

Figure 8A:
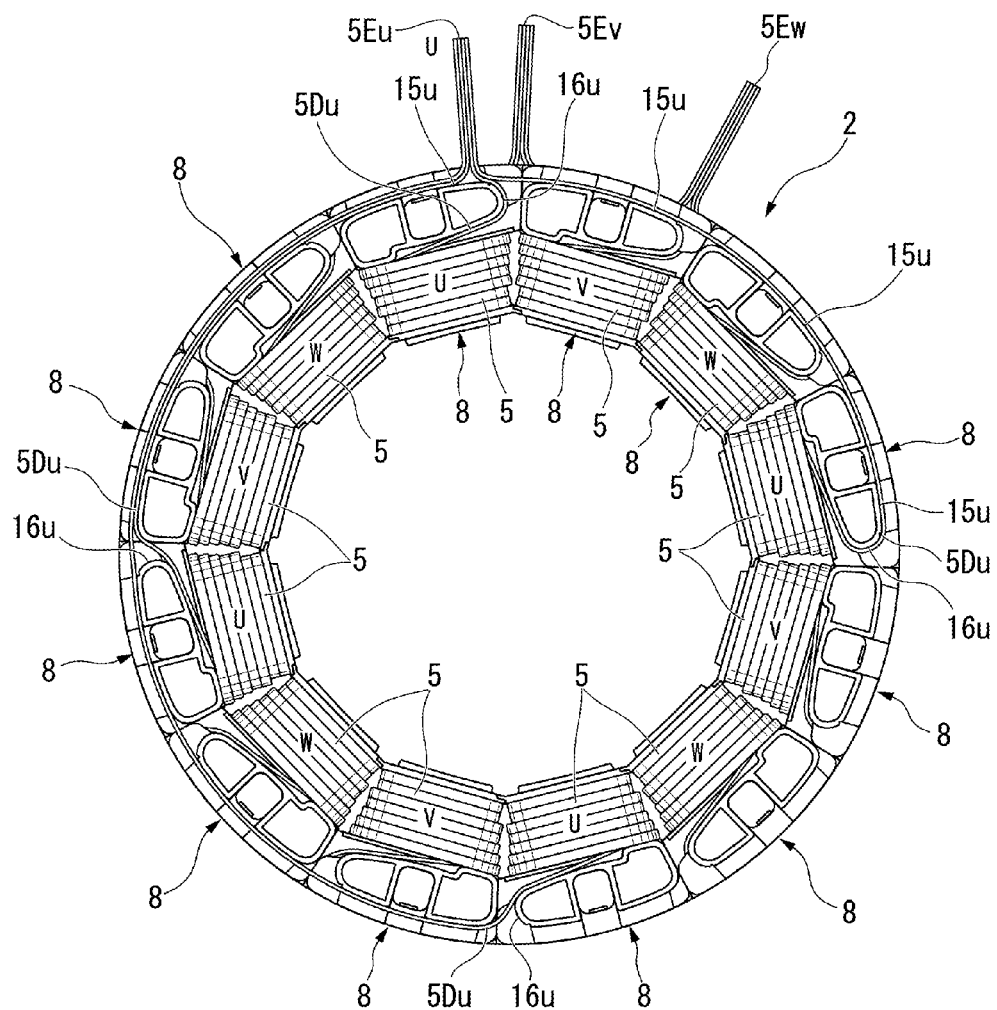
FIG. 8A is a schematic partial cross-sectional front view of the stator core showing the leading of power supply-side coil conductors for a U phase in the rotary electric machine according to the embodiment of the invention.
Figure 8B:
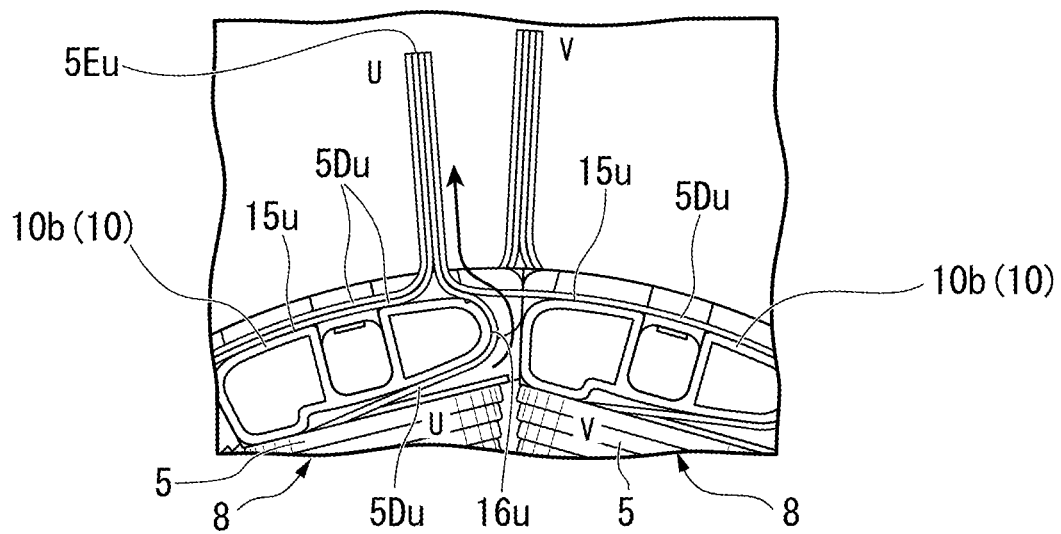
FIG. 8B is a partially enlarged view of FIG. 8A.

FIG. 8A is a view showing the leading of the power supply-side leading portions 5Du of the respective coil conductors 5 for a U phase on the stator core 2. FIG. 8B is a partially enlarged view of FIG. 8A.

As shown in these drawings, the leading portions 5Du of the coil conductors 5, which are led from the four split core pieces 8 for a U phase, are led to one point on the circumference of the stator core 2 along the guide groove 15u of the insulator 10, and are folded so as to protrude from the point to the outside of the stator core 2 in the radial direction. The end portions (connection ends 5Eu) of these folded leading portions 5Du are bundled as one, and are connected to the corresponding power supply terminal 7U (see FIGS. 1 to 3) for a U phase by fusing.

Figure 9A:
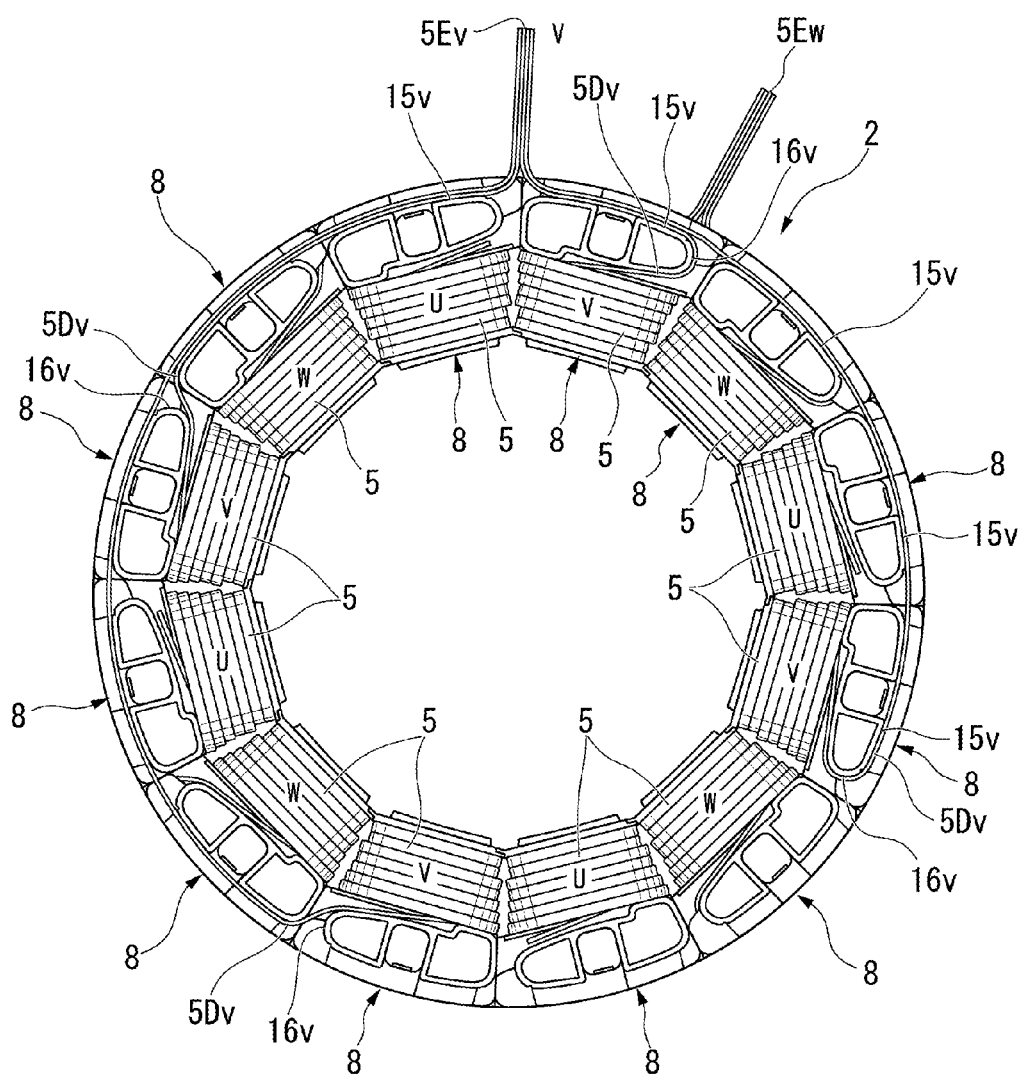
FIG. 9A is a schematic partial cross-sectional front view of the stator core showing the leading of power supply-side coil conductors for a V phase in the rotary electric machine according to the embodiment of the invention.
Figure 9B:
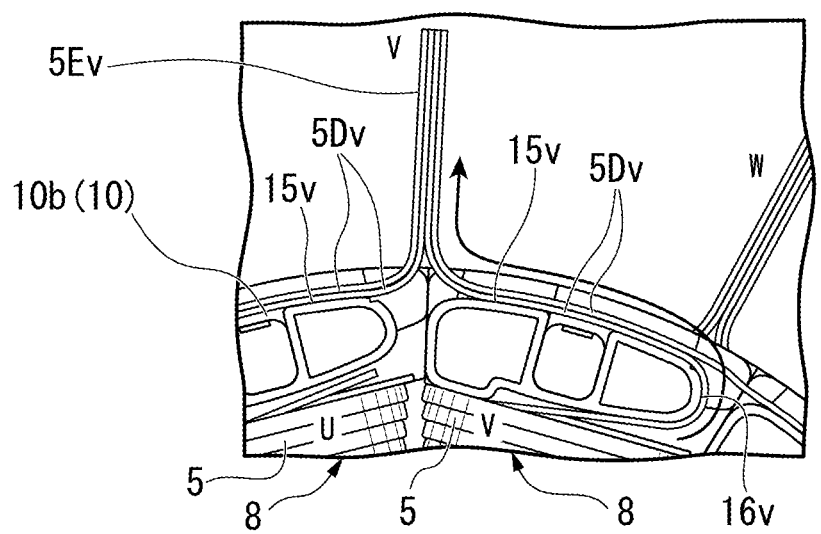
FIG. 9B is a partially enlarged view of FIG. 9A.
Figure 10A:
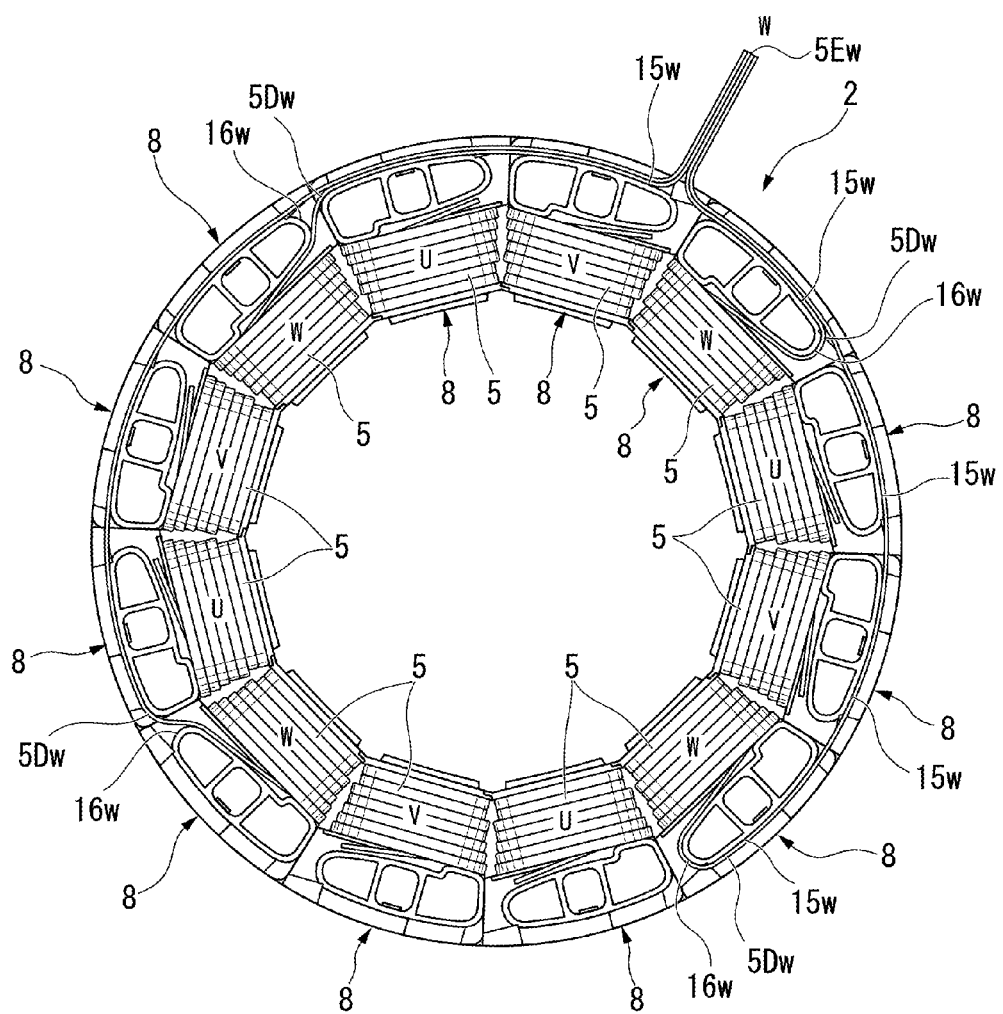
FIG. 10A is a schematic partial cross-sectional front view of the stator core showing the leading of power supply-side coil conductors for a W phase in the rotary electric machine according to the embodiment of the invention.
Figure 10B:
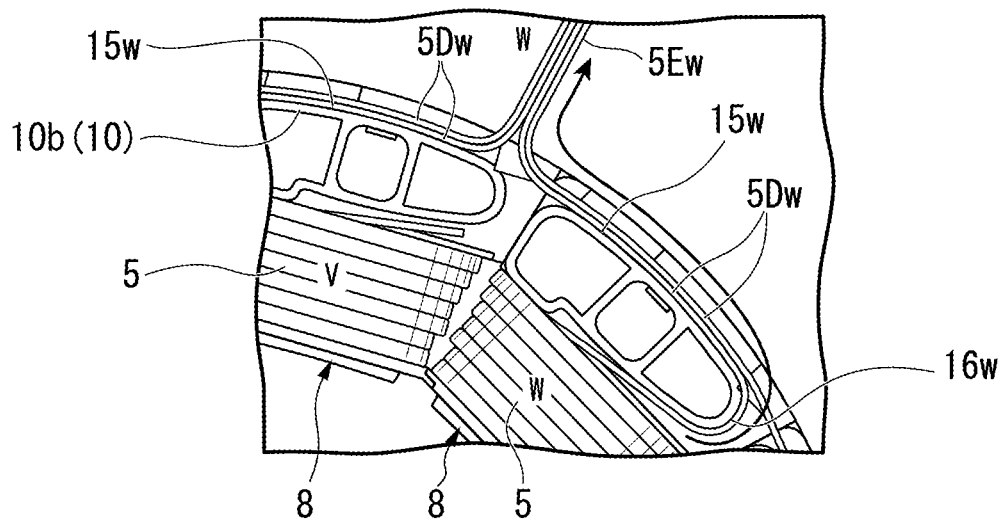
FIG. 10B is a partially enlarged view of FIG. 10A.

FIG. 9A is a view showing the leading of the power supply-side leading portions 5Dv of the respective coil conductors 5 for a V phase on the stator core 2, and FIG. 10A is a view showing the leading of the power supply-side leading portions 5Dw of the respective coil conductors 5 for a W phase on the stator core 2. FIGS. 9B and 10B are partially enlarged views of FIGS. 9A and 10A, respectively.

As shown in these drawings, similar to the leading portions 5Du for a U phase, the leading portions 5Dv and 5Dw, which are led from the four split core pieces 8 for a V phase and the four split core pieces 8 for a W phase, are led to one point on the circumference of the stator core 2 along the guide grooves 15v and 15w of the insulator 10, respectively, and are folded so as to protrude from the point to the outside of the stator core 2 in the radial direction. The end portions (the connection ends 5Ev and 5Ew) of the respective leading portions 5Dv and 5Dw for a V phase and a W phase are bundled as one, and are connected to the corresponding power supply terminals 7V and 7W (see FIGS. 1 to 3), respectively, by fusing.

Figure 11A:
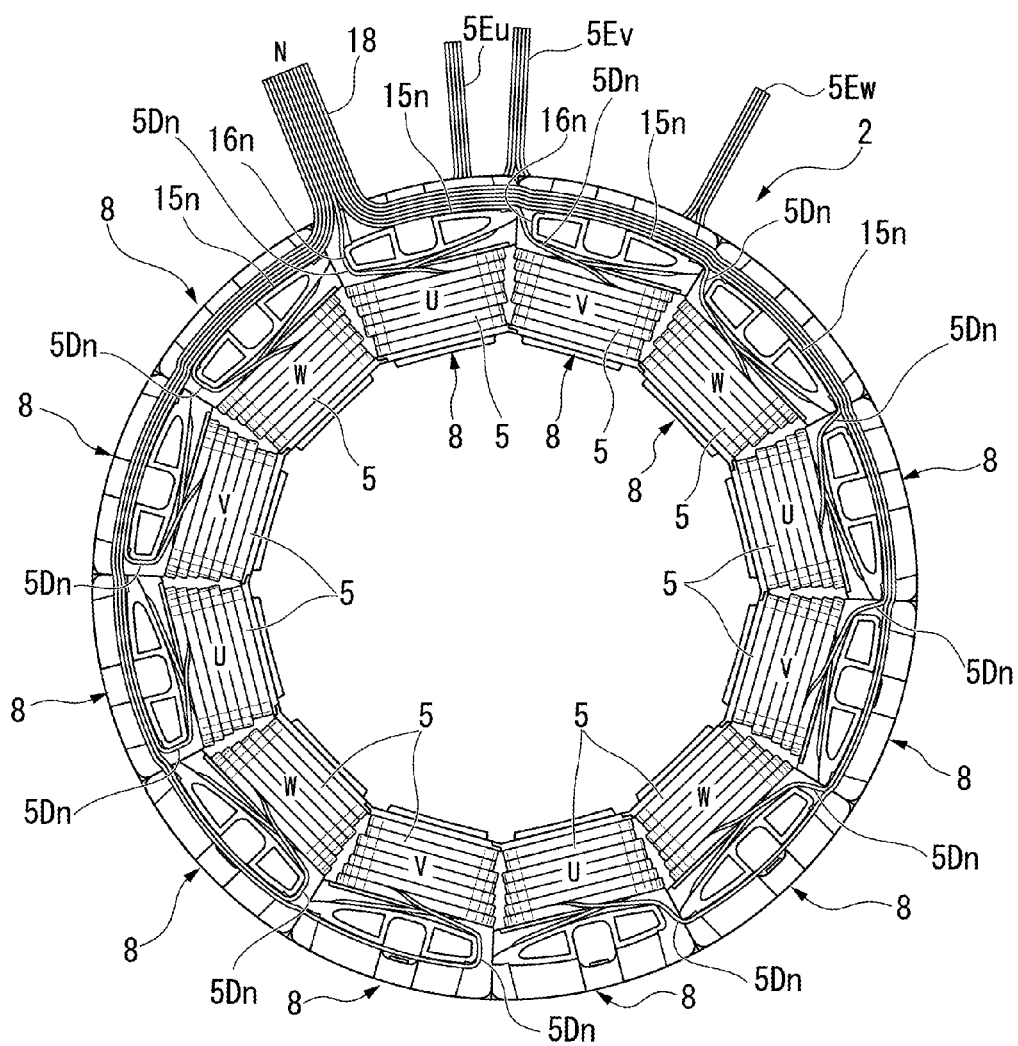
FIG. 11A is a schematic partial cross-sectional front view of the stator core showing the leading of midpoint-side coil conductors for the respective phases, that is, a U phase, a V phase, and a W phase in the rotary electric machine according to the embodiment of the invention.
Figure 11B:
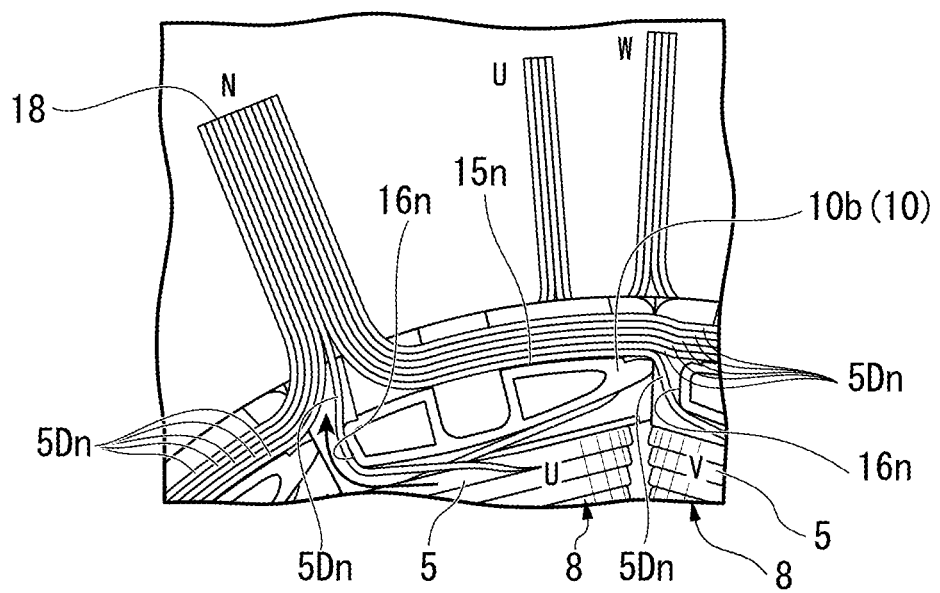
FIG. 11B is a partially enlarged view of FIG. 11A.

FIG. 11A is a view showing the leading of the neutral point-side leading portions 5Dn of the respective coil conductors 5 for a U phase, a V phase, and a W phase on the stator core 2. FIG. 11B is a partially enlarged view of FIG. 11A.

As shown in these drawings, the neutral point-side leading portions 5Dn of the coil conductors 5 led from all the split core pieces 8 are led to one point on the circumference of the stator core 2 along the guide groove 15n of the insulator 10, and are folded so as to protrude from the point to the outside of the stator core 2 in the radial direction. The end portions of all the neutral point-side leading portions 5Dn are electrically connected to each other by fusing, and are also physically connected to each other. The end portions of the neutral point-side leading portions 5Dn, which are connected to each other, form a midpoint connecting portion 18.

Figure 12:
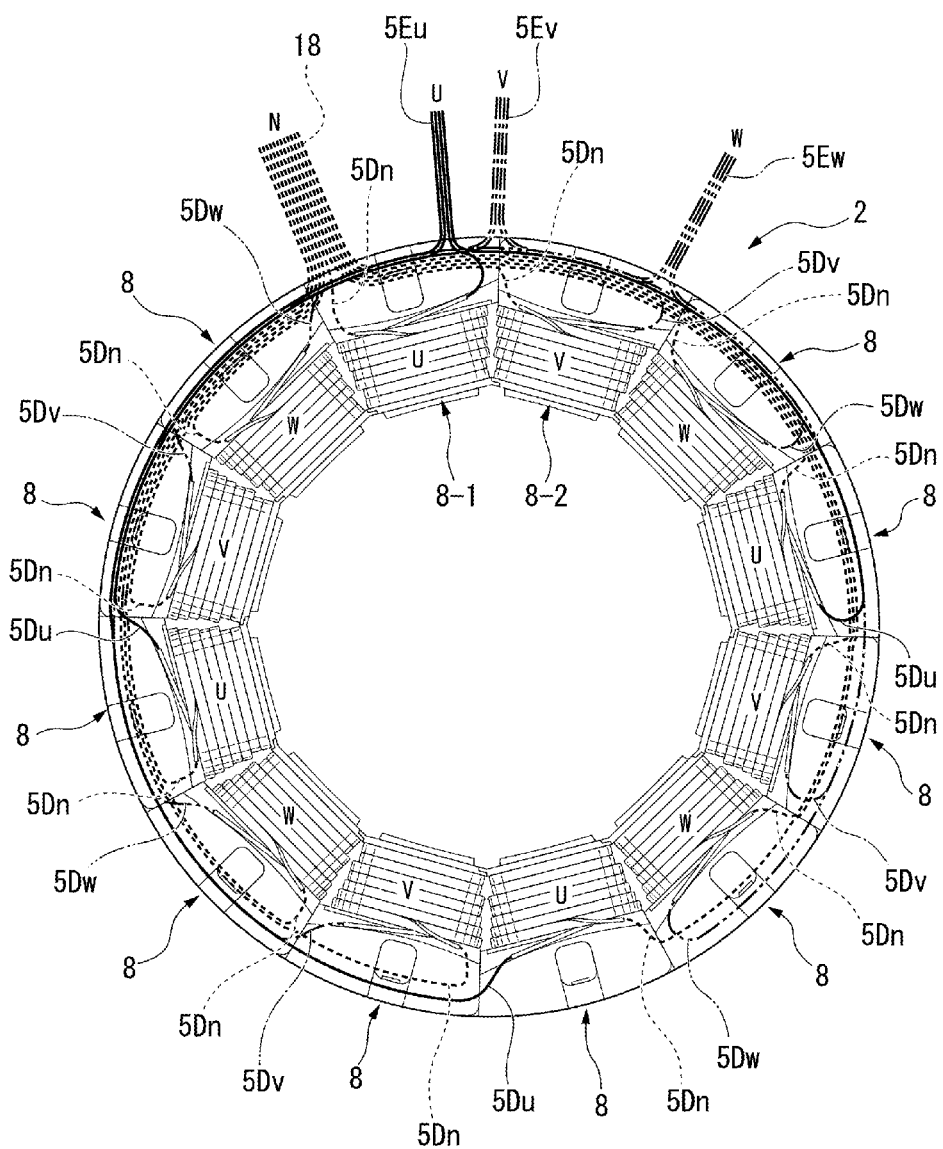
FIG. 12 is a schematic front view of the stator core showing the leading of all the coil conductors for the respective phases, that is, a U phase, a V phase, and a W phase in the rotary electric machine according to the embodiment of the invention.

FIG. 12 is a view showing the leading of the leading portions 5Du, 5Dv, 5Dw, and 5Dn of all the coil conductors 5 on the stator core 2.

As shown in FIG. 12, the respective connection ends 5Eu, 5Ev, and 5Ew for a U phase, a V phase, and a W phase and the midpoint connecting portion 18 are each led from different positions on the circumference of the stator core 2, but are disposed on in regions that are close to each other on the circumference of the stator core 2.

Specifically, the connection ends 5Eu for a U phase are disposed at one end of one split core piece 8-1 of the stator core 2 in the circumferential direction, and the midpoint connecting portion 18 is disposed at the other end of the split core piece 8-1 in the circumferential direction. Further, the connection ends 5Ev for a V phase are disposed at an end portion, which is close to the connection ends 5Eu for a U phase, of a split core piece 8-2 adjacent to one end of the split core piece 8-1, and the connection ends 5Ew for a W phase are disposed at an end portion of the split core piece 8-2 that is separated from the connection ends 5Eu for a U phase. That is, in the case of this embodiment, the respective connection ends 5Eu, 5Ev, and 5Ew and the midpoint connecting portion 18 are collectively disposed in the outer regions of two adjacent split core pieces 8-1 and 8-2 in the radial direction.

Each of the coil conductors 5 of which the end portions of the neutral point-side leading portions 5Dn are guided to the guide grooves 15n of the respective insulators 10 and led from one point on the stator core 2 is formed of a rectangular wire. Accordingly, while the end portions of the neutral point-side leading portions are folded to the outside in the radial direction, flat surfaces of the end portions of the neutral point-side leading portions can come into surface contact with each other. The flat surfaces of the end portions of the plurality of leading portions 5Dn come into contact with each other in this way and overlap each other in the shape of layers and the end portions of the plurality of leading portions 5Dn are connected to each other by being subjected to fusing together with a binding plate 19 (a binding member) made of metal in this state, so that the midpoint connecting portion 18 is formed. The binding plate 19 is fixed to the respective leading portions 5Dn while holding the peripheral portions of the end portions of the plurality of leading portions 5Dn.

FIGS. 13A to 13G and 14A to 14D are views showing an example of fusing that is to form the midpoint connecting portion 18.

The detail of the fusing will be described with reference to FIGS. 13A to 13G and 14A to 14D.

Figure 13A:
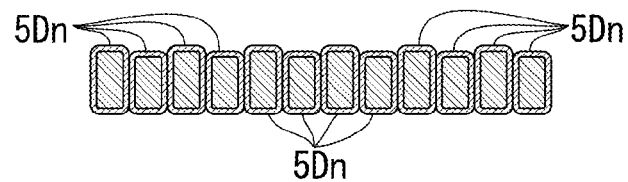
FIG. 13A is a schematic cross-sectional view illustrating the fusing of a midpoint connecting portion of the stator core of the rotary electric machine according to the embodiment of the invention.
Figure 13B:
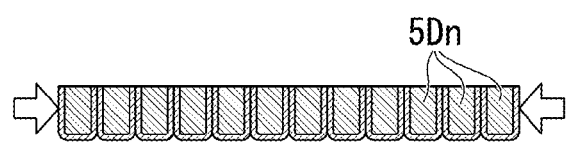
FIG. 13B is a schematic cross-sectional view illustrating the fusing of the midpoint connecting portion of the stator core of the rotary electric machine according to the embodiment of the invention (the continuation of FIG. 13A).

First, as shown in FIG. 13A, the leading portions 5Dn of the coil conductors 5 overlap each other in the shape of layers and are aligned in a line. After that, as shown in FIG. 13B, the leading portions 5Dn of the coil conductors 5 are clamped from both sides thereof in a lamination direction and a portion of films of one end faces of the rectangular wires in a longitudinal direction are removed in this state. Accordingly, the variation of the heights of the coil conductors 5 in the longitudinal direction is absorbed (that is, the heights of the coil conductors are made uniform).

Figure 13C:
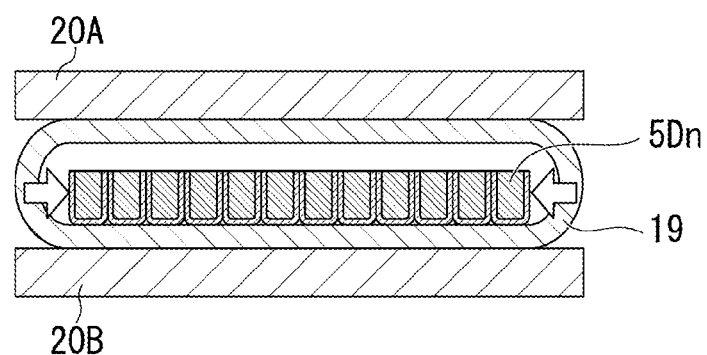
FIG. 13C is a schematic cross-sectional view illustrating the fusing of the midpoint connecting portion of the stator core of the rotary electric machine according to the embodiment of the invention (the continuation of FIG. 13B).
Figure 13D:
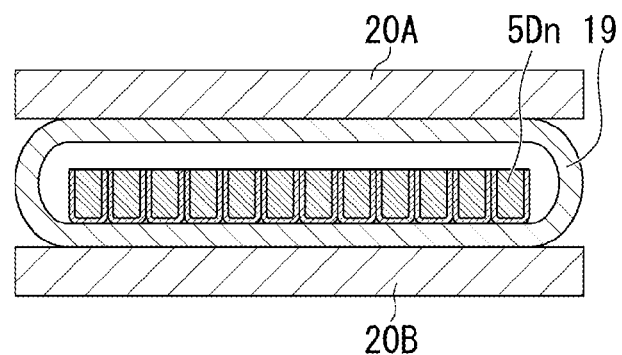
FIG. 13D is a schematic cross-sectional view illustrating the fusing of the midpoint connecting portion of the stator core of the rotary electric machine according to the embodiment of the invention (the continuation of FIG. 13C).
Figure 13E:
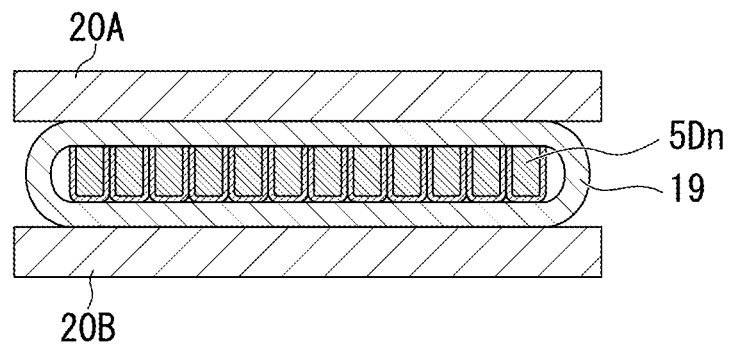
FIG. 13E is a schematic cross-sectional view illustrating the fusing of the midpoint connecting portion of the stator core of the rotary electric machine according to the embodiment of the invention (the continuation of FIG. 13D).

Next, while the plurality of coil conductors 5 are clamped, the peripheral portions of the coil conductors are wrapped in the binding plate 19 and are set between a pair of electrodes 20A and 20B for fusing as shown in FIG. 13C. Preliminary caulking is performed from this state by the electrodes 20A and 20B as shown in FIGS. 13D and 13E to improve the degree of adhesion, so that a current flow path between the binding plate 19 and each coil conductor 5 is ensured.

Figure 13F:
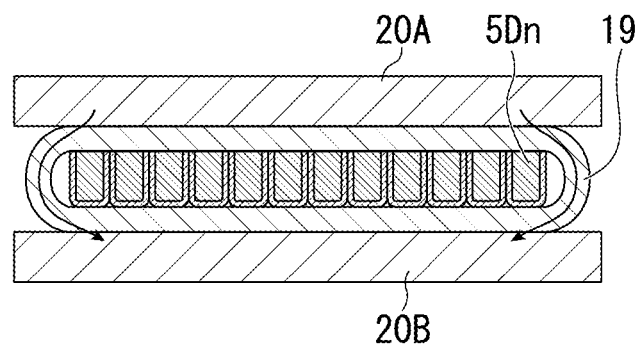
FIG. 13F is a schematic cross-sectional view illustrating the fusing of the midpoint connecting portion of the stator core of the rotary electric machine according to the embodiment of the invention (the continuation of FIG. 13E).
Figure 13G:
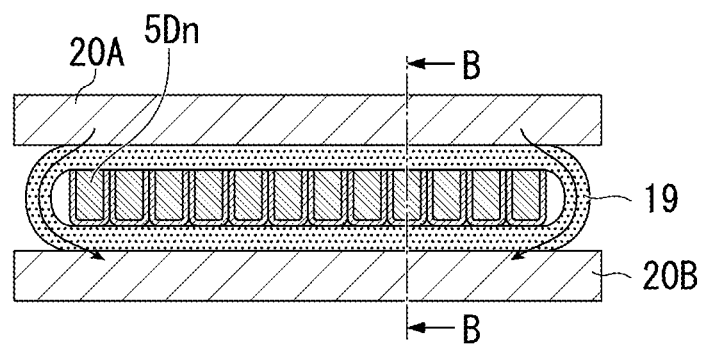
FIG. 13G is a schematic cross-sectional view illustrating the fusing of the midpoint connecting portion of the stator core of the rotary electric machine according to the embodiment of the invention (the continuation of FIG. 13F).

After that, the binding plate 19 and the coil conductors 5 are interposed between the electrodes 20A and 20B and current starts flowing through the electrodes 20A and 20B as shown in FIG. 13F, and a pressure-contact force of the electrodes 20A and 20B is increased as shown in FIG. 13G.

Figure 14A:
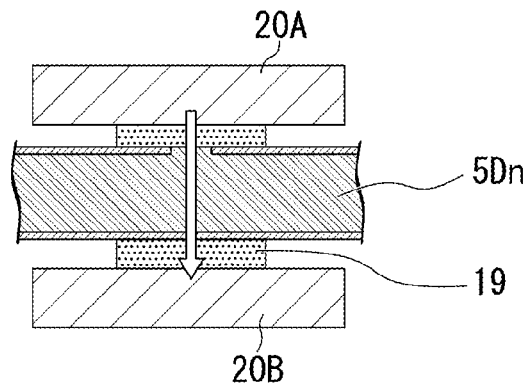
FIG. 14A is a view illustrating the fusing of the midpoint connecting portion of the stator core of the rotary electric machine according to the embodiment of the invention, and is a schematic cross-sectional view corresponding to a cross-section taken along line B-B of FIG. 13G.
Figure 14B:
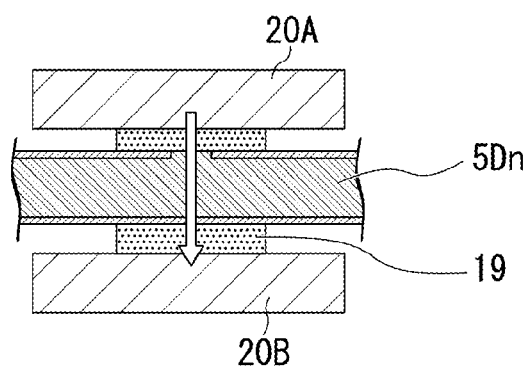
FIG. 14B is a view illustrating the fusing of the midpoint connecting portion of the stator core of the rotary electric machine according to the embodiment of the invention, and is a schematic cross-sectional view corresponding to a cross-section taken along line B-B of FIG. 13G (the continuation of FIG. 14A).
Figure 14C:
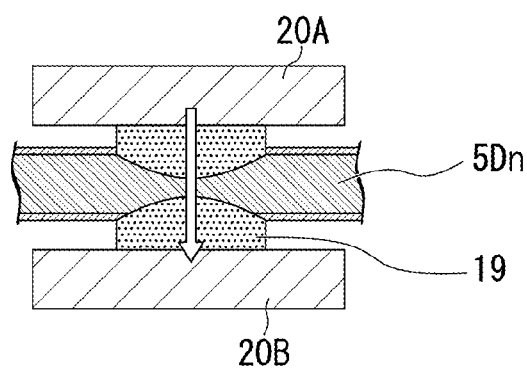
FIG. 14C is a view illustrating the fusing of the midpoint connecting portion of the stator core of the rotary electric machine according to the embodiment of the invention, and is a schematic cross-sectional view corresponding to a cross-section taken along line B-B of FIG. 13G (the continuation of FIG. 14B).
Figure 14D:
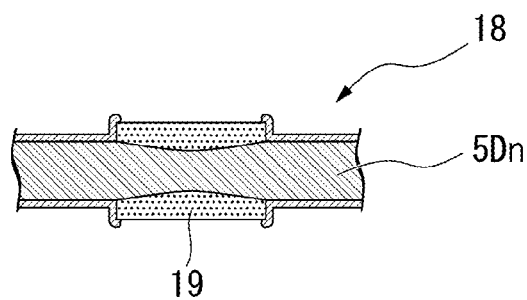
FIG. 14D is a view illustrating the fusing of the midpoint connecting portion of the stator core of the rotary electric machine according to the embodiment of the invention, and is a schematic cross-sectional view corresponding to a cross-section taken along line B-B of FIG. 13G (the continuation of FIG. 14C).

When current flows and a pressure-contact force is applied as described above, the temperature of the binding plate 19 rises and a portion of films of the coil conductors 5 are discharged as shown in FIGS. 14A and 14B. When current further continues to flow and a pressure-contact force further continues to be applied, the films of the coil conductors 5 are completely discharged. Accordingly, the softened coil conductors 5 are gradually fixed to the binding plate 19. FIG. 14D shows a state in which fusing has been completed and the midpoint connecting portion 18 has been formed.

Although detailed description will be omitted here, the respective connection ends 5Eu, 5Ev, and 5Ew for a U phase, a V phase, and a W phase of the coil conductors 5 come into surface contact with each other between the respective flat surfaces of the rectangular wires as shown in FIGS. 1 to 3 and are connected to the corresponding power supply terminals 7U, 7V, and 7W by the same fusing as described above in this state. Plate-like connection portions 21 corresponding to the binding plate 19 are provided at the respective power supply terminals 7U, 7V, and 7W, and the connection portions 21 are connected to the corresponding connection ends 5Eu, 5Ev, and 5Ew.

As shown in FIGS. 1 and 3, the stator core 2, which is formed as described above, is fitted to the cylindrical holder 6 and is fixed and installed in the housing 4 as an integrated stator 1. The terminal block 3, which has a substantially arc shape in a plan view, is fixed and installed in the housing 4 so as to be adjacent to a part of the outer peripheral surface of the stator 1.

The entire terminal block 3 is made of an insulating resin material. As shown in FIG. 3, the terminal block 3 includes an arc-shaped base wall 22 that is substantially orthogonal to the axis of the stator 1, and an outer wall 23 that surrounds three sides except for the arc-shaped inner peripheral side of the base wall 22. The inner peripheral side of the base wall 22 on which the outer wall 23 is not present is formed so as to face the outer peripheral surface of the stator 1. That is, while being fixed and installed in the housing 4 together with the stator 1, the terminal block 3 forms a recessed space that is surrounded by the base wall 22, the outer wall 23 and the outer peripheral surface of the stator 1.

A connector (not shown) to which external power supply lines are connected is installed outside the outer wall 23 of the terminal block 3. Terminals for three phases, that is, a U phase, a V phase, and a W phase, of the connector are connected to the power supply terminals 7U, 7V, and 7W of the stator 1 through bus bars (metal plates) (not shown) for three phases that pass through the terminal block 3. One ends of the respective bus bars are disposed on the base wall 22 facing the recessed space, and are fastened to the corresponding power supply terminals 7U, 7V, and 7W on the base wall 22 by bolts. Reference numeral 24 of FIG. 3 denotes bolts that join the terminals.

As shown in FIG. 3, fastening portions between the respective power supply terminals 7U, 7V, and 7W and the corresponding bus bars are disposed so as to be separated from each other in the arc direction of the base wall 22. Further, a fixing portion of the terminal block 3 is provided at a position that is adjacent to the fastening portion close to one end (lower side in FIG. 3) of the base wall 22 in the arc direction, and the fixing portion is fastened and fixed to the housing 4 by a bolt 25 that is a fastening member.

Further, partition walls 26a, 26b, and 26c, which electrically insulate the fastening portions of the adjacent power supply terminals 7W, 7V, and 7U and electrically insulate the fastening portion of the power supply terminal 7U from a housing fixing portion (the bolt 25), are provided on the base wall 22.

Here, the respective connection ends 5Eu, 5Ev, and 5Ew for a U phase, a V phase, and a W phase, which protrude to the outside of the stator 1 in the radial direction, are joined to the corresponding bus bars, which are present on the base wall 22 of the terminal block 3, through the power supply terminals 7U, 7V, and 7W, which extend so as to be bent in the axial direction of the stator 1, by bolts. However, the midpoint connecting portion 18 is not fixed to any one of the bus bars, and protrudes into a space portion that is surrounded by the outer wall 23 of the terminal block 3. Specifically, the midpoint connecting portion 18 protrudes at a position, which is separated from a head portion of the bolt 25 in the axial direction, in the space portion which is surrounded by the outer wall 23 of the terminal block 3 and the partition wall 26c and in which the bolt 25 for fixing the terminal block is disposed. Accordingly, the midpoint connecting portion 18 protrudes into the terminal block 3 at a position that is present outside the stator core 2 in the radial direction, overlaps an installation portion of the bolt 25 in a circumferential direction, and is separated from the installation portion in the axial direction.

As described above, in the rotary electric machine according to this embodiment, the coil conductors 5 wound around the respective split core pieces 8 are formed of rectangular wires having a rectangular cross-section, and the neutral point-side leading portions 5Dn of the respective coil conductors 5 are led so as to be bent to the outside of the stator core 2 in the radial direction at one point of the peripheral portion of the stator core 2 and form the midpoint connecting portion 18 in which the flat surfaces of the rectangular wires come into surface contact with each other and are physically and electrically connected to each other. For this reason, it is possible to connect the neutral point-side end portions of the respective coil conductors 5 without using large exclusive connecting components such as a midpoint bus ring. Further, since the respective leading portion 5Dn forming the midpoint connecting portion 18 are rectangular wires and come into close contact with each other over a large area, the state of the connection between the leading portions 5Dn can be stabilized and a space occupied by the midpoint connecting portion 18 in the machine can be further reduced in this rotary electric machine. Accordingly, it is possible to reduce the size, the weight, and the manufacturing cost of the machine in this rotary electric machine.

In this rotary electric machine, the neutral point-side leading portions 5Dn of the plurality of coil conductors 5, that is, the rectangular wires overlap each other in the shape of layers and are aligned in a line. The aligned leading portions 5Dn are held by the binding plate 19 made of metal, and the binding plate 19 is connected to the leading portions 5Dn of the respective coil conductors 5 in this state by fusing. For this reason, it is possible to easily and reliably connect the neutral point-side end portions of the plurality of coil conductors 5.

In this rotary electric machine, the power supply terminals 7U, 7V, and 7W for the respective U, V, and W phases are disposed close to one point on the outer periphery of the stator core 2 and the midpoint connecting portion 18 is disposed at a position adjacent to the power supply terminal 7U on the outer periphery of the stator core 2. For this reason, there is an advantage of collectively disposing the plurality of current flow portions, which protrude to the outer peripheral side of the stator core 2, in a narrow region and stably managing these current flow portions in a small space.

In particular, in the rotary electric machine according to this embodiment, the insulating terminal block 3 is disposed close to the outer peripheral portion of the stator 1 fixed and installed in the housing 4, the power supply terminals 7U, 7V, and 7W for the respective phases of the stator core 2 are connected to the corresponding bus bars on the terminal block 3, and the midpoint connecting portion 18 is adapted to protrude into an insulation space that is formed in the terminal block 3. For this reason, it is possible to more stably ensure the insulation between the midpoint connecting portion 18 and the housing 4 made of metal or the power supply terminals 7U, 7V, and 7W for the respective phases by the insulating walls of the terminal block 3.

Moreover, in the rotary electric machine according to this embodiment, the midpoint connecting portion 18 protrudes at a position, which is separated from the head portion of the bolt 25 in the axial direction, in the space portion which is formed in the terminal block 3 and in which the bolt 25 for fixing the terminal block is disposed. For this reason, it is possible to insulate the midpoint connecting portion 18 from the surroundings by effectively using a position, which is present on the extension of the head portion of the bolt 25 for fixing the terminal block and forms a dead space, on the terminal block 3. Accordingly, the size of the terminal block 3 can be further reduced in this rotary electric machine.

In the rotary electric machine according to this embodiment, the midpoint connecting portion 18 and the connection end 5Eu of the coil conductor 5 for one phase are set to protrude from the arc-shaped region of one split core piece 8 (see the split core piece 8-1 of FIG. 12) to the outside in the radial direction. For this reason, there is also an advantage of further reducing the size of the terminal block 3 by making the midpoint connecting portion 18 be close to the power supply-side connection ends 5Eu, 5Ev, and 5Ew.

The invention is not limited to the above-mentioned embodiment, and may have various modifications in design without departing from the scope of the invention.

INDUSTRIAL APPLICABILITY

Neutral point-side end portions of the respective coil conductors, which are formed of rectangular wires, are led from one point of the peripheral portion of the stator core to the outside of the stator core, and form the midpoint connecting portion in which flat surfaces of the rectangular wires come into surface contact with each other, the adjacent coil conductors are physically joined to each other, and all the rectangular wires (the respective coil conductors) are electrically connected to each other. For this reason, it is possible to connect the neutral point-side end portions of the respective coil conductors in a stable connection state without adding large exclusive components, and to suppress an occupied space to a small size. As a result, it is possible to reduce the size, the weight, and the manufacturing cost of the machine.

DESCRIPTION OF THE REFERENCE SYMBOLS

2: stator core
3: terminal block
4: housing
5: coil conductor
5Eu, 5Ev, 5Ew: connection end
7U, 7V, 7W: power supply terminal
8: split core piece
18: midpoint connecting portion
19: binding plate (binding member)
25: bolt (fastening member)

The invention claimed is:

1. A rotary electric machine comprising:
a stator core formed of a plurality of split core pieces that are annularly arranged therein, coil conductors being wound around respective split core pieces,
wherein one ends of the respective coil conductors which are wound around the respective split core pieces are connected to power supply terminals for corresponding phases, and other ends of the respective coil conductors are connected to each other to form a neutral point,
the respective coil conductors are formed of rectangular wires,
the neutral point-side end portions of the respective coil conductors are each led to an outside of the stator core from only one point on a circumference of the stator core, and
the neutral point-side end portions form a midpoint connecting portion in which flat surfaces of the rectangular wires come into surface contact with each other, the adjacent rectangular wires are physically joined to each other, and all of the rectangular wires are electrically connected to each other, wherein
the midpoint connecting portion is disposed at a position adjacent to any one of the power supply terminals for the respective phases,
the stator core is installed in a housing together with a terminal block, the housing containing the stator core,
the midpoint connecting portion is disposed so as to protrude into the terminal block,
the terminal block is fixed to the housing at an outer peripheral portion of the stator core by a fastening member, and
the midpoint connecting portion protrudes into the terminal block at a position that is resent outside the stator core in a radial direction overlaps an installation portion of the fastening member in a circumferential direction of the stator core, and is separated from the installation portion in an axial direction of the stator core.

2. The rotary electric machine according to claim 1, wherein in the midpoint connecting portion, the neutral point-side end portions of the plurality of coil conductors are aligned in a line in a state that the rectangular wires overlap each other in the shape of layers, the neutral point-side end portions, which are aligned in a line, are held by a binding member made of metal, and the binding member is connected to the neutral point-side end portions of the respective coil conductors by fusing.

3. The rotary electric machine according to claim 1, wherein the power supply terminals for the respective phases, which are connected to one ends of the respective coil conductors, are collectively disposed at one point outside the stator core.

4. The rotary electric machine according to claim 3, wherein the terminal block is made of an insulating material, and the power supply terminals for the respective phases are connected to corresponding external power supply lines in the terminal block.

5. The rotary electric machine according to claim 4, wherein connection ends of the respective coil conductors, which are connected to the power supply terminals for the respective phases, protrude from an outer peripheral side of the stator core toward the outside in the radial direction, and the midpoint connecting portion and one or more connection ends of the connection ends protrude to the outside of one split core piece of an outer peripheral surface of the stator core in the radial direction.

6. The rotary electric machine according to claim 2, wherein the power supply terminals for the respective phases, which are connected to one ends of the respective coil conductors, are collectively disposed at one point outside the stator core.

7. The rotary electric machine according to claim 6, wherein the terminal block is made of an insulating material, and the power supply terminals for the respective phases are connected to corresponding external power supply lines in the terminal block.

8. The rotary electric machine according to claim 7, wherein connection ends of the respective coil conductors, which are connected to the power supply terminals for the respective phases, protrude from an outer peripheral side of the stator core toward the outside in the radial direction, and the midpoint connecting portion and one or more connection ends of the connection ends protrude to the outside of one split core piece of an outer peripheral surface of the stator core in the radial direction.

* * * * *